United States Patent [19]

Kubo et al.

[11] 4,428,402

[45] Jan. 31, 1984

[54] METHOD AND APPARATUS FOR CLOSING ONE END OF SHIRRED SYNTHETIC CASING STICK AND SHIRRED SYNTHETIC CASING STICKS CLOSED

[75] Inventors: Seiji Kubo, Tokyo; Kengi Ishibashi, Tami, both of Japan

[73] Assignee: Kubo Sekkei, Ltd., Japan

[21] Appl. No.: 310,730

[22] Filed: Oct. 13, 1981

[30] Foreign Application Priority Data

Oct. 25, 1980 [JP] Japan .............................. 55-149942

[51] Int. Cl.³ ............................................. A22C 13/00
[52] U.S. Cl. ............................... 138/118.1; 383/120; 206/802
[58] Field of Search .................... 229/62, 53; 150/3; 138/89, 109, 118.1; 426/125, 135, 138

[56] References Cited

U.S. PATENT DOCUMENTS

| | | | |
|---|---|---|---|
| 2,036,687 | 4/1936 | Fisher | 150/1 |
| 2,722,714 | 11/1955 | Blizzard et al. | 17/42 |
| 3,419,401 | 12/1966 | Matecki | 17/34 |
| 3,454,982 | 7/1966 | Arnold | 17/42 |
| 3,882,252 | 5/1975 | Winkler | 426/135 |
| 3,942,568 | 3/1976 | Stemmler | 229/53 |
| 3,942,569 | 3/1976 | Becker et al. | 229/53 |

FOREIGN PATENT DOCUMENTS

| | | |
|---|---|---|
| 35-17582 | 1/1960 | Japan . |
| 35-15792 | 5/1960 | Japan . |
| 38-2131 | 2/1963 | Japan . |
| 41-5899 | 5/1966 | Japan . |
| 43-13663 | 6/1968 | Japan . |
| 43-24936 | 6/1968 | Japan . |
| 49-4953 | 3/1974 | Japan . |

*Primary Examiner*—John W. Shepperd
*Attorney, Agent, or Firm*—Kenway & Jenney

[57] ABSTRACT

The specification describes a shirred synthetic casing stick closed at one end by first extending an end portion of the shirred stick to form an unshirred end casing portion. The end casing portion is then twisted at a point to form an inner end casing section, and an outer end casing section separated by the twist. The outer end casing section is turned inside out (inverted) to cover at least a part of the inner end casing section and to thereby prevent untwisting. In a preferred embodiment, the end casing portion is twisted at a point indented, from the end of the extended casing portion, 1-2 times the diameter of the stick. The entire end casing portion is preferably inserted within the stick. In another embodiment, the stick is made of regenerated cellulose and an aperture is formed through the twisted closure portion. The specification also describes a method and apparatus for making such an end-closed, shirred synthetic casing stick.

4 Claims, 16 Drawing Figures

METHOD AND APPARATUS FOR CLOSING ONE END OF SHIRRED SYNTHETIC CASING STICK AND SHIRRED SYNTHETIC CASING STICKS CLOSED

BACKGROUND OF THE INVENTION

1. Field of the Invention:

This invention relates to a method and apparatus for closing one end of a shirred synthetic casing stick as well as to a shirred synthetic casing stick closed at one end.

2. Description of the Prior Art:

Tubular synthetic casings for stuffing meat emulsions such as highly seasoned minced meat, particularly sausage casings made of regenerated cellulose, are generally thin-walled long tubular bodies. These tubular casings are used in the form of shirred cylindrical bodies, in other words, as shirred casing sticks with a stuffing machine for a meat emulsion such as a highly seasoned minced meat.

Early types of shirring machines and shirred casing sticks are disclosed, for example, in Japanese Pat. No. 274,407 (Japanese Pat. Publication No. 15,792/1960 publsihed Oct. 20, 1960), Japanese Pat. No. 277,857 (Japanese Pat. Publication No. 17,582/1960 published Nov. 30, 1960), Japanese Pat. No. 310,260 (Japanese Pat. Publication No. 2,131/1963 published Mar. 14, 1963), U.S. Pat. No. 2,722,714 issued Nov. 8, 1955 to James R. Blizzard et al., and U.S. Pat. No. 3,454,982 issued July 15, 1969 to Lionel C. Arnold.

In actual practice the casing stick used on a stuffing machine is obtained by shirring a casing of 20–30 $\mu$m in wall thickness and 12–50 m in length to a length 1/30–1/120 of the initial length by means of a shirring machine.

After producing shirred casing sticks (hereinafter referred to as "sticks" for simplicity), they are packed and shipped to meat processors, where they are used with meat stuffing machines.

Manual or automatic stuffing machines are used for stuffing. An example of automatic stuffing machines is disclosed in Japanese Pat. Publication No. 5,899/1966 published Mar. 30, 1966, in which each stick is automatically mounted on a stuffing pipe, filled with a meat emulsion and finally formed into links of a uniform length.

To permit a stick to be stuffed by means fo such an automatic stuffing machine, it is necessary that one end of the stick be firmly closed. Otherwise, it is impossible to extend the pleats of the stick by the internal pressure of the meat emulsion stuffed into the stick under pressure by a stuffing machine. In addition, if one end is not closed the meat emulsion will inevitably be scattered around upon filling. Thus, meat processors will suffer from lost productivity, wasting of meat emulsion, etc. and certain sanitary problems will arise. Also the closed end portion of a stick should be made of the same material as the stick per se because it is necessary to recover the meat emulsion stuffed into the closed end portion.

Examples of sticks closed at one end and methods for closing one end of a stick are disclosed in the following Japanese Pat. Nos. 534,004 (Japanese Pat. Publication No. 13,663/1968 published June 10, 1968); 540,883 (Japanese Pat. Publication No. 24,936/1968 published Oct. 28, 1968); 719,815 (Japanese Pat. Publication No. 25,119/1973 published July 26, 1973); and 755,165 (Japanese Pat. Publication No. 4,953 published Feb. 4, 1974).

However, such conventional sticks have drawbacks in that their safety is not sufficient or casing materials are wasted.

SUMMARY OF THE INVENTION

In order to solve the above-mentioned drawbacks of the prior art, an object of this invention is to provide a shirred casing stick provided at one end with a closure which is formed of the casing material only, allowing effective use of stuffing pressure by providing high pressure resistance.

Another object of this invention is to provide an apparatus for producing the above-described casing stick.

A further object of this invention is to provide a method for the production of the above-described casing stick.

In one aspect of this invention, there is provided a shirred synthetic casing stick closed at one end. The stick consists of a shirred synthetic casing whose one end portion is extended to form an end casing portion. The end casing portion is twisted at a point to form an inner end casing section, a twisted closure and an outer end casing section. The outer end casing section is turned inside out to cover at least a part of the inner end casing section. In a more preferred embodiment, the point of twist is indented within the stick at a point 1–2 times the diameter of the stick distant from the end of the pulled out casing. The inner end casing section extends within the interior of the stick inwardly along the inner wall of the stick and then outwardly within the space defined by the inwardly extending portion of the inner end casing section. The outer end casing section covers at least the outwardly extending portion of the inner end casing section.

In another aspect of this invention, there is provided a method for closing one end of a shirred synthetic casing stick. The method comprises pulling out in the axial direction, an end portion of the stick to form an end casing portion, twisting said end casing portion at a point to form an inner end casing section, a twisted closure and an outer end casing section, and turning the outer end casing section inside out to cover at least a part of the inner end casing section. The twisted closure is preferably at a point 1–2 times the diameter of the stick distant from the end of the pulled out casing; and the entire end casing portion is preferably inserted into the interior of the stick.

In a further aspect of this invention, there is provided an apparatus for closing one end of a shirred synthetic casing stick. The apparatus includes, as a separate body, a stick-retaining mandrel having a tip portion of a diameter smaller than that of the mandrel, as well as a main body including a shaping cylinder having an outer diameter smaller than the inner diameter of the stick and an inner diameter larger than the diameter of the tip portion of the mandrel, a push rod disposed within the interior of the shaping cylinder and capable of being abutted against the tip portion of the mandrel, and a desired number of claws mounted on the circumference of the shaping cylinder for gripping the proximal end portion of the stick. The shaping cylinder, push rod and claws are slidably and rotatably mounted on the main body. The mandrel, push rod and shaping cylinder are axially aligned.

These and other objects, features and advantages of the present invention will be more apparent from the following description and accompanying drawings.

BRIEF DESCRIPTION OF THE DRAWINGS

FIGS. 6-A through 6-I illustrate various production steps in the formation of a casing stick according to this invention;

DETAILED DESCRIPTION OF THE INVENTION

A first aspect of this invention relates to a stick closed at one end. This aspect will be described below in detail with reference to the embodiments illustrated in the drawings.

Figure 1:
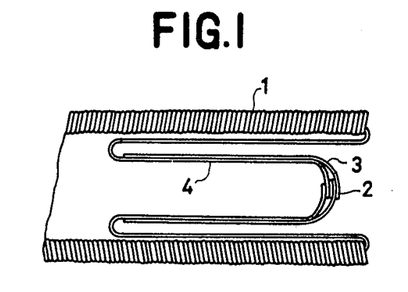
FIG. 1 is a schematic cross-sectional illustration showing one embodiment of an end closure for a casing stick according to this invention.

FIG. 1 is a schematic cross-sectional illustration showing one embodiment of an end closure for a casing stick according to this invention. A closure portion 2 is formed by twisting an end portion of a shirred synthetic casing stick 1 which has been pulled out in the axial direction of the stick. The twisted closure 2 is shown indented from the outer extremity of the stick by a distance about 1–2 times the diameter of the casing stick 1. A cup-shaped casing 3, which is located outside the twisted portion is turned, inside out (in the form of a turned-back cup) to cover another cup-shaped casing portion 4 which is located inside the twisted portion, namely, adjacent the main body of the stick.

The basic stick of this invention has now been completed. It is however preferred to insert, as shown in FIGS. 1 and 2, the closure 2 and cup-shaped casing portions 3, 4 back into the stick main body in such a manner that the closed portion 2 is positioned at the end face of the main stick body, in other words, the inverted cup-shaped casing 3 is prevented at locations near the closed portion 2 from reassuming its initial position.

Figure 2:
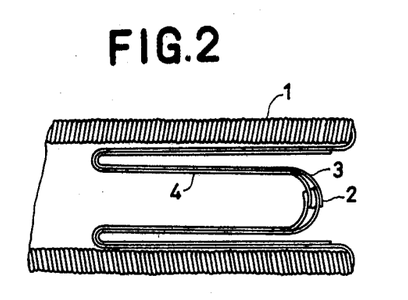
FIG. 2 is a schematic cross-sectional illustration showing another embodiment of the end closure for the casing stick according to this invention.

The state of the twisted closure 2 and cup-shaped portions after their insertion into the main body of the stick varies as shown in FIGS. 1 and 2 depending on the distance from the twisted closure 2 to the outer extremity of the pulled out portion and the length to be inserted. In the embodiment shown in FIG. 1, the distance from the twist 2 to the outer extremity of the pulled out portion and the distance of insertion are identical to each other while, in the embodiment illustrated in FIG. 2, the ratio for the two distances is about 2:1.

Figure 4:
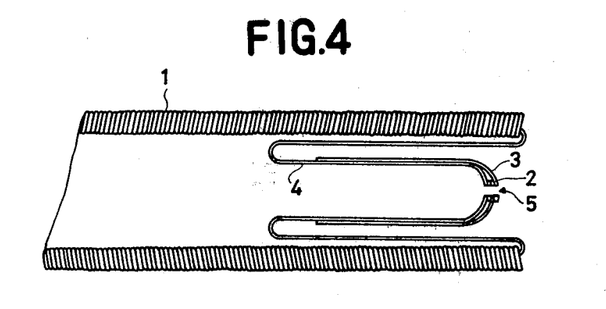
FIG. 4 is a schematic cross-sectional illustration showing a further embodiment of the end closure for the casing stick according to this invention, through which end closure an aperture is formed.

Furthermore, as is shown in FIG. 4, it is possible to form through the twisted closure portion an aperture 5 when disirable in accordance with the casing material and type of meat to be stuffed, e.g., where the casing material is regenerated cellulose and its water content should be maintained at a suitable level. Of course, it is necessary to enclose such a casing within a package for maintaining the water content at a suitable level.

Where tubular casings used in the present invention are intended for use in the production of wienerwursts or frankfurters, they are principally made of regenerated cellulose. They may also be formed of any suitable shirrable natural or synthetic materials such as collagen, amylose, starch, polyvinyl alcohol, alginate, cellulose derivatives, or casein; or polyethylene, polystyrene, polyvinyl chloride, Saran (a vinyl chloride-vinylidene chloride copolymer), polypropylene, polyester, or nylon films.

Figure 3:
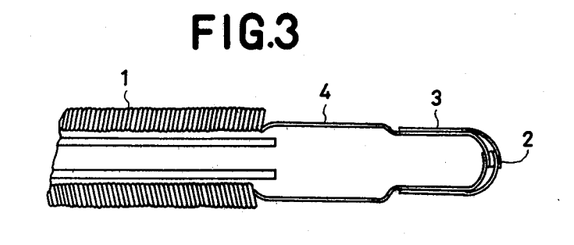
FIG. 3 is a cross-sectional illustration showing the casing stick of FIG. 1 in use on a stuffing machine.

Now, the function and effects of the stick closed at one end, which is one aspect of this invention, is explained with reference to the cross-sectional view illustrated in FIG. 3 to show its state in use.

The closure includes a twisted portion 2, a pulled-out cup-shaped casing portion 4 located at the stick 1 side, and an inverted cup-like casing portion 3 which is turned inside out to cover the cup-shaped casing 4. When the stick is stuffed under pressure, the casings 3, 4 expand under internal stresses due to the stuffing pressure.

At the twisted closure 2, a radial force is applied due to the expansion of the casing 4. A part of this radial force is converted to a rotary force which acts to untwist the closure 2. Here, the inverted cup-like casing 3, which is one of the features of this invention, is forced into close contact with the casing 4 which is in an expanded state due to the pressure of the meat emulsion, thereby countering and overcoming the rotary force tending to open the twist 2 owing to frictional forces generated between casings 3, 4.

Thus, a high internal pressure generates a radial force which acts to enhance the firm closure at the twisted portion 2.

Thus, the present invention enables formation of a closure having extremely high resistance to pressure by using the casing material only, while minimizing waste of casing material as much as possible.

By forming the aperture 5, it is possible to meet requirements for gas permeability where needed.

Now, the apparatus for closing one end of a stick, which is the second aspect of this invention, is described in detail with reference to the embodiments shown in the drawings.

Figure 5:
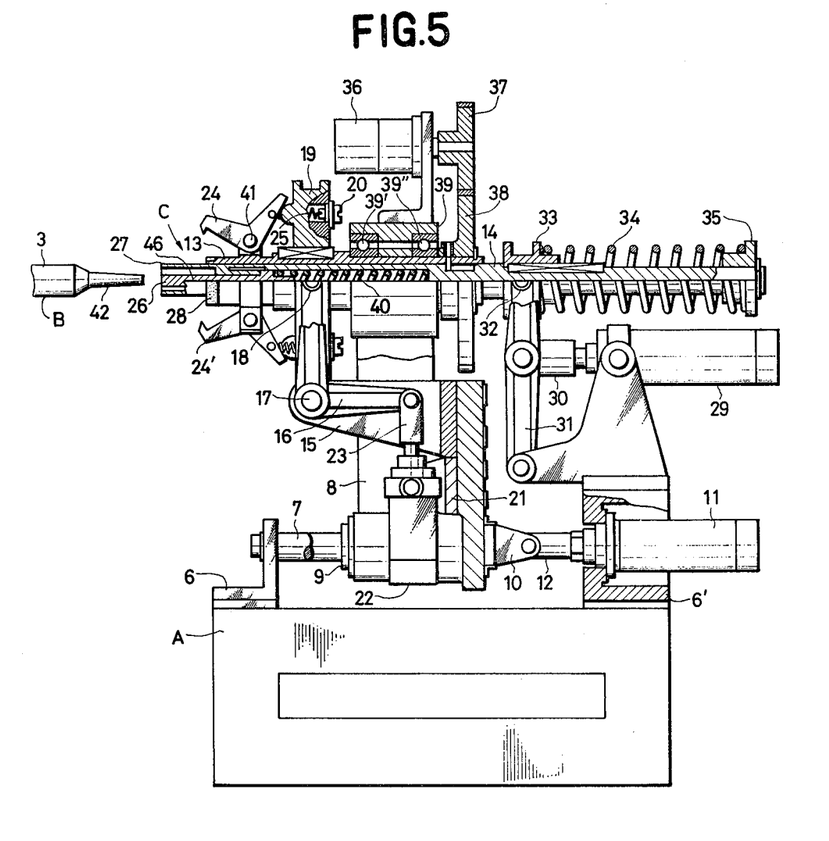
FIG. 5 is a fragmentary cross-sectional side elevation of one embodiment of an end-closing apparatus according to this invention.

A support frame 8 is mounted on a metal slide 9 secured on a guide shaft 7 which is in turn supported on a base A by means of brackets 6, 6'. This support frame 8 is slid via a metallic support member 10 and clevis 12 by a cylinder 11 fixed on the bracket 6'. At an upper portion of the support frame 8, is provided a bearing 39. Bearings 39', 39" rotatably support a sleeve 13.

The sleeve 13 is provided with a rubber ring 28 at the front end thereof and a bore for receiving a shaft 14. At the front end of the shaft 14, is provided a shaping cylinder 27 which is adapted to be inserted into the interior of a stick, while, within the shaft 14 and adjacent to the front end of same, is disposed a push rod 26 which is urged frontwards (i.e., leftward in the drawing) by a spring 40.

On the circumferential surface of the shaping cylinder 27, there are arranged a desired number of claws 24, 24' which are adapted to hold the pleats at the proximal end of the stick 1. The claws 24, 24' are supported by their respective rotary support pins 41 and pulled against their corresponding shifter pulleys 19 by means of their respective springs 25 via their corresponding spring attachment metal pieces 20. Thus, the claws 24, 24' are actuated by the back and forth reciprocating movement (in the drawing, the leftward and rightward movement) of the shifter pulleys 19. Specifically, when the shifter pulleys 19 advance, the claws 24, 24' fall down toward the sleeve 13 and hold the pleats at the end of the stick. On the other hand, when they retreat, the claws 24, 24' release the pleats.

The mechanism for the back and forth movement of these shifter pulleys 19 includes a cylinder 22 mounted on a metallic support member 21 which is in turn attached to the support frame 8, a clevis coupled with the cylinder 22, a metallic support member 15 secured to the support frame 8, a rotary support pin 17 supported by the metallic support member 15, a lever disposed on the rotary support pin 17, a roller 18 provided with the lever 16, etc.

The twisting mechanism for the formation of sticks closed at one end includes a rotary driving sleeve 13, a driving motor 36, gears 37, 38, etc.

The mechanism for reciprocating the shaping cylinder 27 includes a shifter pulley 33, spring 34, a spring stopper 35, a cylinder 29 mounted on the brackets 6, 6', clevis 30, a rotatably supported lever 31, a roller secured to the lever 31, etc.

In FIG. 5, designated at letter B is a mandrel adapted to mount and retain the stick 1 thereon (See, FIGS. 6-A through 6-I). A tip portion 42 is formed somewhat smaller in diameter than the main body 3 of the mandrel B. The mandrel B is axially aligned with the push rod 26 of the head C and the shaping cylinder 27 of the end-closing apparatus.

Figure 6A:
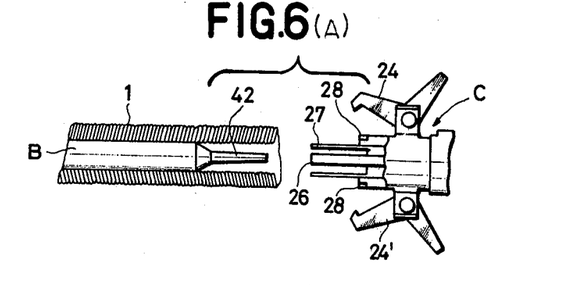
Figure 6B:
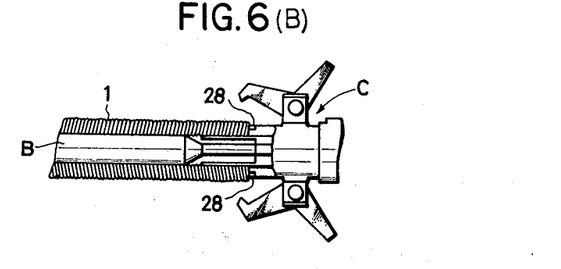
Figure 6C:
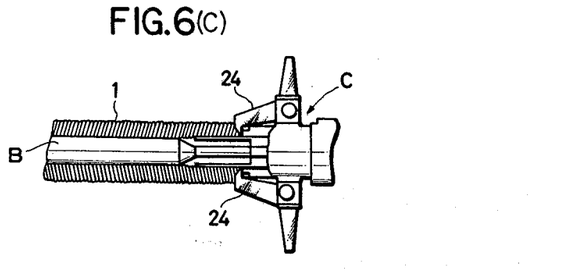
Figure 6D:
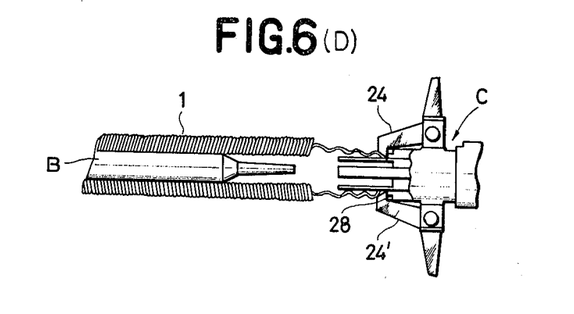
Figure 6E:
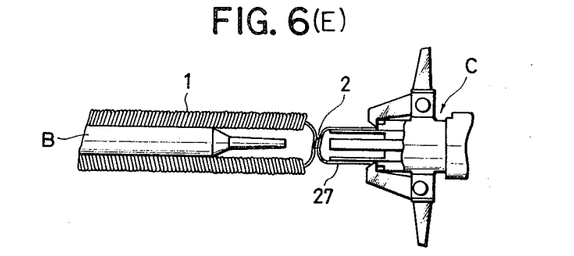
Figure 6F:
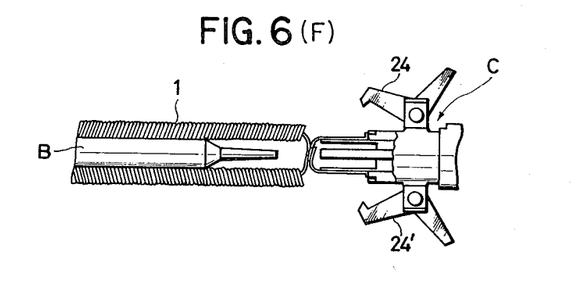
Figure 6G:
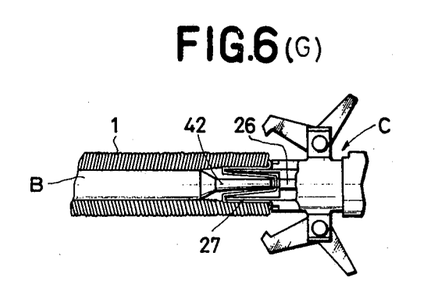
Figure 6H:
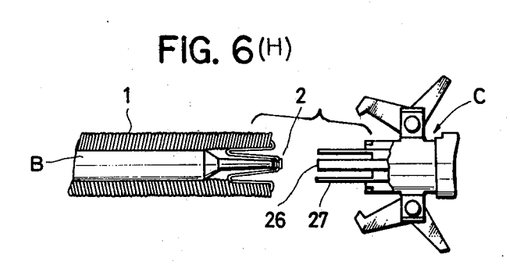
Figure 6I:
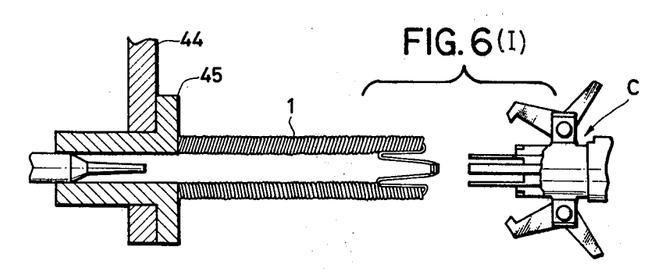
Figure 8:
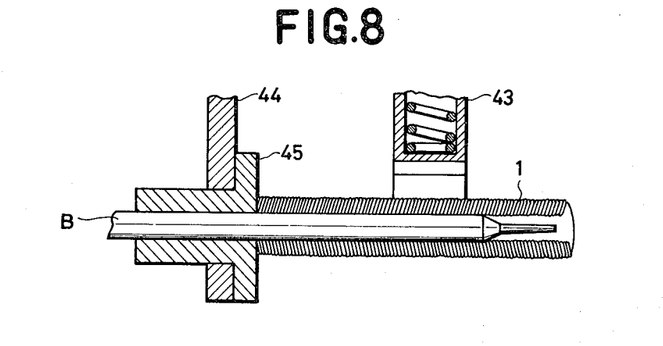
FIG. 8 is a fragmentary cross-sectional view of a stick-holding mechanism.

As shown in FIG. 8, there is provided a fixing device 43, for the stick 1 mounted on the mandrel B, at a position behind the end of mandrel B. The fixing device 43 has a built-in spring. Further behind the fixing device 43, a stopper 45 for the stick 1 is supported by means of a support plate 44 (See, FIGS. 6-1 and 8).

The operation of the end-closing apparatus according to this invention will be described hereinafter in connection with FIGS. 6-A through 6-I.

FIG. 6-A illustrates the position of the head C relative to the mandrel B for retaining a stick thereon for initiation of the production of a stick closed at end. The stick 1 is mounted on the stick-retaining mandrel B. The stick 1 is held at a predetermined position relative to the head C by means of the fixing device 43 with a built-in spring and the support plate 44 (See, also FIG. 8).

In FIG. 6-B, the head C has been advanced by the driving force of the cylinder 11 to a position where the rubber ring 28 of the head C is abutted against the stick 1 so as to grip the end pleat of the stick 1 retained on the stick-retaining mandrel B.

The next step is illustrated in FIG. 6-C, in which the end pleat of the stick 1 is gripped by the claws 24, 24' which are operated by the driving force of the cylinder 22.

In FIG. 6-D, the head C has been withdrawn to a predetermined position by actuating the cylinder 11 while maintaining the end pleat of the stick 1 gripped between the claws 24, 24' and the rubber ring 28. In other words, the casing at the proximal end portion of the stick 1 has been pulled out.

FIG. 6-E depicts the state of the casing stick after the completion of a twisting operation. This twisting operation is carried out by using the driving force of the motor 36. The number of twists depends on the casing mateiral. In the present embodiment, it is suitable to twist the casing 1 to 3 times.

During the twisting operation, the fixing device 43 is activated to prevent the rotating force, which is generated upon twisting the casing in the head C, from being transmitted to the stick 1. Needless to say, the fixing device 43 would be unnecessary where the stick 1 is fitted firmly over the stick-retaining mandrel B.

In the above state, the end casing of the stick 1 is pulled out axially. The twisted closure portion 2 is formed at a position indented 1-2 times the diameter of the casing, from the pulled out end of the casing. The casing section located at the pulled-out end side with respect to the twisted closure portion 2 is formed into a cup-like casing portion 3 in such a fashion that it conforms to the outer cylindrical surface of the shaping cylinder 27.

In FIG. 6-F, a plurality of claws 24, 24' arranged at equal intervals around the circumference of the shaping cylinder 27 have been released by the actuation of the cylinder 22.

FIG. 6-G illustrates the step of inserting the pulled-out casing portion including the closure portion 2 into an end interior portion of the stick 1. The shaping cylinder 27, advanced by the driving force of the cylinder 29, the shaft 14, supporting the cylinder 27 thereon, and the push rod 26, urged by the spring 40 disposed within the shaft 14, all cooperate to insert the pulled-out casing the into the main (shirred) body of the casing 1, and advance toward the stick-retaining mandrel B and stick 1. At the same time, the sleeve 13 and rubber ring 28 advance in the same direction by means of the cylinder 11. An advancement of the shaping cylinder 27 is followed by an advanced displacement of the push rod 26 which is pushed by the spring 40 built in the shaft 14. This causes the shaping cylinder 27 to be thrusted into the interior of the portion of the stick 1 together with the cup-like casing 3.

Then, push rod 26 pushes back the twisted closure portion 2. Owing to the provision of the spring 40 built in the shaft 14, the closure portion 2 is gradually compressed between the front end of the push rod 26 and the rear end of the stick-retaining mandrel B. In this state, the push rod 26 stops its advance while held biased by the spring 40 and the twisted closure portion 2 is thereby held in place. Accordingly, the shaping cylinder 26 penetrates into the end interior portion of the stick 1 to create a state wherein the tip portion 42 of the stick-retaining mandrel B is covered with the casing material. The extent of the advance of the shaping cylinder 27 is determined by the actuation of the cylinder 29.

FIG. 6-H shows the head C which has been withdrawn to its normal position after the completion of the formation of the closed stick and the dismounting of the same. in the course of the withdrawal, the shaping cylinder 27 is first withdrawn by the cylinder 29. The push rod 26 is withdrawn together with the shaping cylinder 27 is brought into abutment with a step 46 formed on the inner wall of the shaping cylinder 27 as the shaft 14 retreats by the action of the spring 40 disposed in the interior of the shaft 14. At the same time, the rubber ring 28 fixed on the sleeve 13 as well as claws 24, 24' are withdrawn by the cylinder 11. Here, the stick 1 is held in place by the fixing device 43 and the closed end portion formed within the end interior portion of the stick 1 maintains its position while enclosing the tip portion 42 of the stick-retaining mandrel B.

In FIG. 6-I, the stick 1, whose one end has been closed, has been dismounted from the stick-retaining mandrel B. The stopper 45, supported by the support plate 44, is located at the end of the stick 1 opposite closure portion 2. When the stick-retaining mandrel B has retreated beyond the stick-holding face of the stopper 45, it becomes possible to remove the stick 1 whose one end has been closed.

Figure 7:
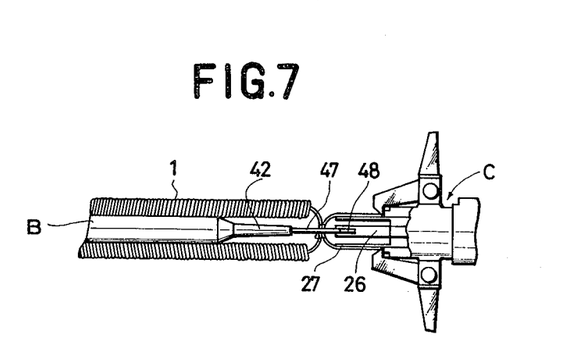
FIG. 7 is a partially enlarged cross-sectional illustration of another embodiment of an end-closing apparatus according to this invention.

FIG. 7 illustrates, on an enlarged scale, the head C of an end-closing apparatus according to a another embodiment of this invention. This apparatus is adapted to produce the stick shown in FIG. 4. In the end-closing apparatus shown in FIGS. 6-A through 6-I, the mandrel B is provided with the tip portion 42. However, the mandrel B depicted in FIG. 7 additionally has a winding rod 47 of a diameter smaller than the tip portion 42 and extends (leftwards in the drawing) from the tip portion 42 toward the head C. Also, an aperture 48 is formed in the push rod 26 disposed within the shaping cylinder 27 at a position for receiving the winding rod 47.

According to the apparatus shown in FIG. 7, the twisted closure portion 2 is formed around the winding rod 47 by the twisting of the stick. Other structural features are the same as those of a stick produced by the apparatus shown in FIG. 5.

Since the end-closing apparatus, which is a second aspect of this invention, is constructed as described above, it has become possible to automaticlly close one end of a shirred synthetic casing stick.

While this invention has been described in terms of foregoing specific embodiments, it is not intended that it be limited thereto, but rather only to the extent set forth hereafter in the claims which follow.

What is claimed is:

1. A shirred synthetic casing stick closed at one end, said stick consisting of a shirred synthetic casing portion and an end portion of said casing extended to form an end casing portion, said end casing portion being twisted at a point to form a twisted closure of the same material forming said casing portion, an inner end casing section on one side of said closure, and an outer end casing section on the other side of said closure, said outer end casing section being turned inside out and covering said twisted closure and at least a part of said inner end casing section, wherein the twist is located at a distance 1-2 times the diameter of the stick from the end of said end casing portion, wherein the inner end casing section extends within the interior of the stick inwardly along the inner wall of the stick and then outwardly within the spacing defined by the inwardly extending portion of the inner end casing section, and wherein the outer end casing section covers at least a part of the outwardly extending portion of the inner end casing section.

2. The shirred synthetic casing stick according to claim 1, wherein the shirred synthetic casing is made of regenerated cellulose and the twisted closure is provided with an aperture.

3. The shirred synthetic casing stick according to claim 1, wherein the twisted closure portion is located approximately at the corresponding end of said shirred casing portion.

4. The shirred synthetic casing stick according to claim 1, wherein the end casing portion is twisted 1-3 times.

* * * * *